(12) United States Patent
Chintan Shah et al.

(10) Patent No.: US 12,531,905 B2
(45) Date of Patent: Jan. 20, 2026

(54) CLOUD-NATIVE FUNCTION AUTHENTICATION AT LAYER 2

(71) Applicant: RAKUTEN SYMPHONY, INC., Tokyo (JP)

(72) Inventors: Paromita Chintan Shah, Tokyo (JP); Nagendra Shridhar Bykampadi, Tokyo (JP); Krishna Pramod Adharapurapu, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 31 days.

(21) Appl. No.: 18/701,063

(22) PCT Filed: Feb. 15, 2024

(86) PCT No.: PCT/US2024/015907
§ 371 (c)(1),
(2) Date: Apr. 12, 2024

(87) PCT Pub. No.: WO2024/211000
PCT Pub. Date: Oct. 10, 2024

(65) Prior Publication Data
US 2025/0247426 A1  Jul. 31, 2025

(30) Foreign Application Priority Data
Apr. 5, 2023  (IN) .............................. 202341025806

(51) Int. Cl.
*H04L 9/40* (2022.01)

(52) U.S. Cl.
CPC ........ *H04L 63/166* (2013.01); *H04L 63/0236* (2013.01); *H04L 63/0823* (2013.01)

(58) Field of Classification Search
CPC ............... H04L 63/166; H04L 63/0236; H04L 63/0823
See application file for complete search history.

(56) References Cited

U.S. PATENT DOCUMENTS 11,489,827 B2    11/2022  Knotwell et al.
2022/0200998 A1*  6/2022  Sudhakaran ............ H04L 63/20

* cited by examiner

*Primary Examiner* — Hee Soo Kim
(74) *Attorney, Agent, or Firm* — Sughrue Mion, PLLC

(57) ABSTRACT

Example embodiments of the present disclosure relate to cloud-native function (CNF) authentication during the instantiation and bootstrapping of the CNF. According to embodiments, a method may be provided, including sending, by a supplicant to an authenticator during an instantiation and bootstrapping stage of a CNF, a message to initiate an Extensible Authentication Protocol-Transport Layer Security (EAP-TLS) protocol sequence, wherein an EAP-TLS authentication is performed with an authentication server based on the message; receiving, by the supplicant, a result of the EAP-TLS authentication from the authenticator, wherein the result of the EAP-TLS authentication originates from the authentication server, and wherein the authenticator is configured to control traffic of the CNF based on the result of the EAP-TLS authentication.

20 Claims, 9 Drawing Sheets

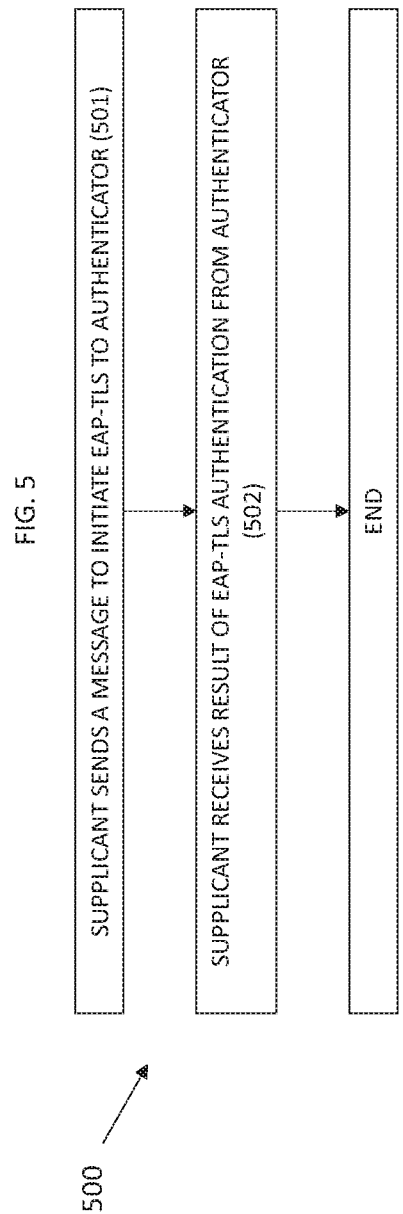

CLOUD-NATIVE FUNCTION AUTHENTICATION AT LAYER 2

CROSS REFERENCE TO RELATED APPLICATIONS

This application is a National Stage of International Application No. PCT/US2024/015907 filed Feb. 15, 2024, claiming priority based on Indian Patent Application number 202341025806 filed Apr. 5, 2023, the entire disclosures of which are incorporated herein by reference.

TECHNICAL FIELD

Apparatuses and methods consistent with example embodiments of the present disclosure relate to cloud-native function authentication at layer 2 of a cloud-native network platform.

BACKGROUND

In the related art, a cloud-native platform may offer a variety of infrastructures, platforms, or software services. A cloud-native function (CNF) may be implemented in order to provide such infrastructures, platforms, or software services, and a CNF may be instantiated and bootstrapped onto the cloud-native platform. The operator of the cloud-native platform may have underlying security approaches in order to prevent a CNF from unauthorized access, breaches, or other cyber threats.

SUMMARY

The related art does not consider security for CNF-level authentication by the underlying cloud-native platform when the CNF is getting on-boarded by the cloud-native platform. In particular, the related art does not support authentication of the CNF during instantiation and bootstrapping. This leads to the possibility of an unauthorized/rogue CNF being on-boarded onto the cloud-native platform. This may cause issues in cases such as public cloud platforms wherein multi-tenancy is normal and on premise cloud infrastructure which may also have multiple tenants sharing the same cloud platform. Security issues created by this potential loophole may affect the stability of the entire cloud platform and the tenants hosted thereon.

Accordingly, there is a need for a solution that can provide CNF-level authentication during instantiation and bootstrapping of the CNF.

According to embodiments, systems and methods are provided for cloud-native function (CNF) authentication during instantiation and bootstrapping of the CNF to support zero-trust container network interfaces. Systems and methods may block unauthenticated CNF's to avoid unauthorized access, breaches, and other cyber threats. According to embodiments, a method may be provided, including sending, by a supplicant to an authenticator during an instantiation and bootstrapping stage of a CNF, a message to initiate an Extensible Authentication Protocol-Transport Layer Security (EAP-TLS) protocol sequence, wherein an EAP-TLS authentication is performed with an authentication server based on the message; receiving, by the supplicant, a result of the EAP-TLS authentication from the authenticator, wherein the result of the EAP-TLS authentication originates from the authentication server, and wherein the authenticator is configured to control traffic of the CNF based on the result of the EAP-TLS authentication. Accordingly, authentication can be achieved at the Ethernet layer (L2) during the onboarding and instantiation stage for the CNF, and provide network isolation on any unsuccessful authentication attempt, since all communications (except Extensive Authentication Protocol over LAN (EAPoL)) for the CNF will be blocked by the cloud-native platform.

According to embodiments, a supplicant may be provided, the supplicant configured to: send to an authenticator during an instantiation and bootstrapping stage of a cloud-native function (CNF), a message to initiate an Extensible Authentication Protocol-Transport Layer Security (EAP-TLS) protocol sequence, wherein an EAP-TLS authentication is performed with an authentication server based on the message; receive a result of the EAP-TLS authentication from the authenticator, wherein the result of the EAP-TLS authentication originates from the authentication server, and wherein the authenticator is configured to control traffic of the CNF based on the result of the EAP-TLS authentication.

According to embodiments, a non-transitory computer-readable recording medium may be provided, having recorded thereon instructions to perform a method including: sending, by a supplicant to an authenticator during an instantiation and bootstrapping stage of a cloud-native function (CNF), a message to initiate an Extensible Authentication Protocol-Transport Layer Security (EAP-TLS) protocol sequence, wherein an EAP-TLS authentication is performed with an authentication server based on the message; receiving, by the supplicant, a result of the EAP-TLS authentication from the authenticator, wherein the result of the EAP-TLS authentication originates from the authentication server, and wherein the authenticator is configured to control traffic of the CNF based on the result of the EAP-TLS authentication.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 5 illustrates a flowchart of a method for CNF authentication according to an embodiment;

DETAILED DESCRIPTION

Figure 1:
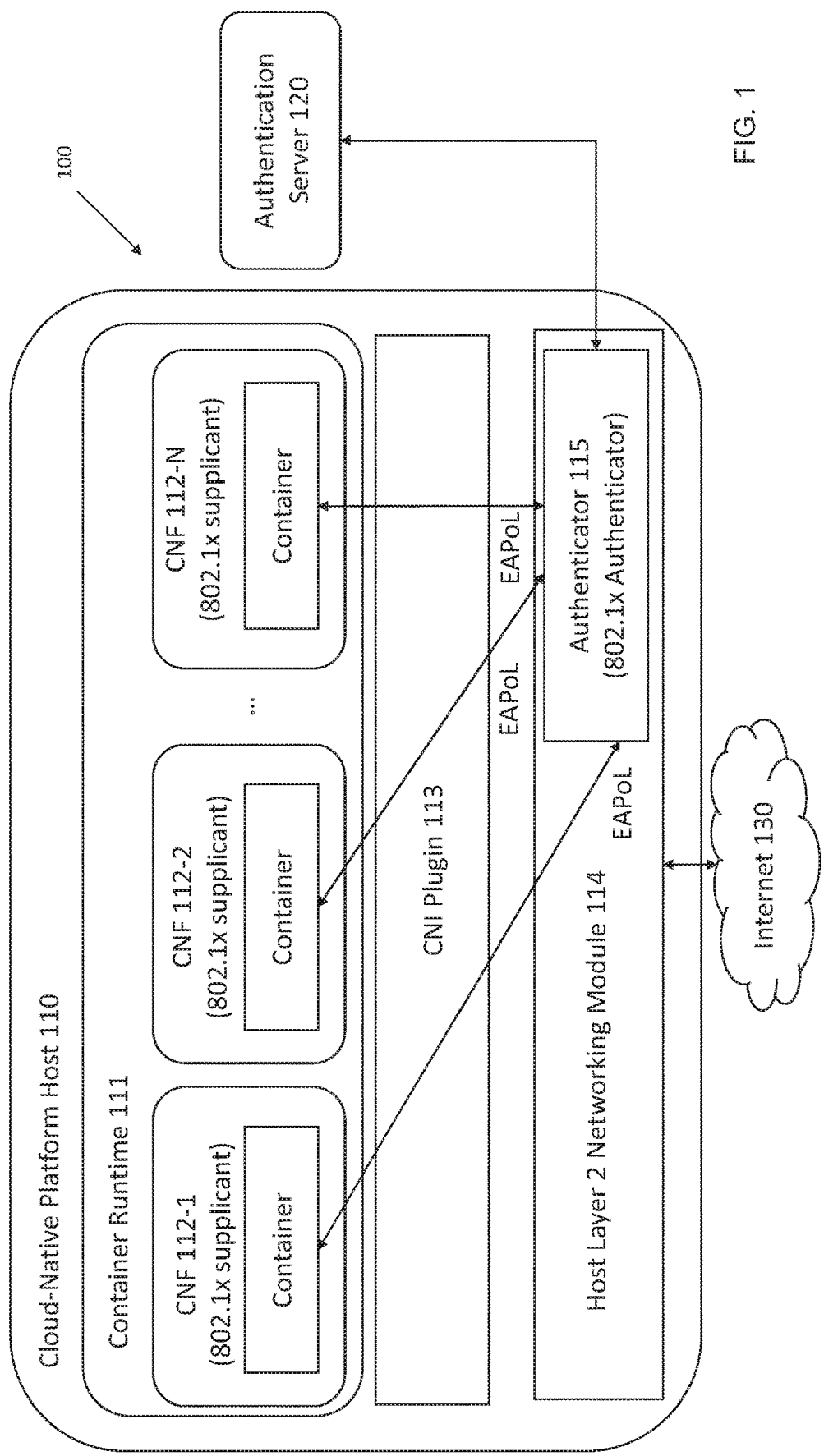
FIG. 1 illustrates a system architecture in which a CNF acts as a supplicant for authentication according to an embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

It shall be noted that, descriptions of example embodiments of the present disclosure may include terms and names defined in one or more standard organizations, such as the 3rd Generation Partnership Project (3GPP) standard organization, the European Telecommunications Standards Institute (ETSI) standard organization, the Open RAN (O-RAN) Alliance, and the like. For instance, the terms RFC 5216, EAPoL, 802.1x and the like, as well as the associated features and operations, are to be interpreted as consistent with those specified in the IEEE specifications, unless being described otherwise. Nonetheless, it should be appreciated that such terms and descriptions are not intended to be exhaustive and that any reasonable variants or modifications to the skilled person shall be considered to be within the scope of this disclosure.

Example embodiments of the present disclosure provide a method and system in which cloud-native function (CNF) authentication is provided during the instantiation and bootstrapping stage of the CNF. This may include sending, by a supplicant (which may either be the CNF itself or a Container Network Interface (CNI) plug-in) to an authenticator (which may be a host layer 2 networking module) during an instantiation and bootstrapping stage of a CNF, a message to initiate an Extensible Authentication Protocol-Transport Layer Security (EAP-TLS) protocol sequence, wherein an EAP-TLS authentication is performed with an authentication server based on the message; receiving, by the supplicant, a result of the EAP-TLS authentication from the authenticator, wherein the result of the EAP-TLS authentication originates from the authentication server, and wherein the authenticator is configured to control traffic of the CNF based on the result of the EAP-TLS authentication. Accordingly, authentication can be achieved at the Ethernet layer (L2) during the onboarding and instantiation stage for the CNF, and provide network isolation on any unsuccessful authentication attempt, since all communications (except Extensive Authentication Protocol over LAN (EAPoL)) for the CNF will be blocked by the cloud-native platform.

FIG. 1 illustrates a system architecture of a system 100 in which a CNF acts as a supplicant for authentication according to an embodiment. Cloud-native platform host 110, authentication server 120, and internet 130 may be provided in the system.

Cloud-native platform host 110 may include container runtime 111. Container runtime 111 may include a plurality of CNF's 112 (112-1, 112-2, . . . 112-N) which may act as an 802.1x supplicant. It should be appreciated that according to some embodiments (not illustrated in FIG. 1), CNF's 112 may instead be configured to act as an 802.1x authenticator. A CNF may be on-boarded (initialized) onto the cloud-native platform host 110 using container runtime 111, or a container orchestrator. Each CNF may have its own container, and communicate with 802.1x Authenticator 115 via Extensible Authentication Protocol over LAN (EAPoL) in order to perform authentication. According to embodiments, EAPoL may be implemented using an Extensive Authentication Protocol-Transport Layer Security (EAP-TLS) protocol sequence.

Cloud-native platform host 110 may include a container network interface (CNI) plug-in 113. CNI plug-in 113 may be used to implement cluster networks and may be used for configuring communication between containers in container runtime 111 of cloud-native platform host 110. The CNI plug-in 113 may also be able to initialize CNF's 112 as a virtual interface.

Cloud-native platform host 110 may also include Host Layer 2 networking module 114. Layer 2 (L2) in this context refers to the Ethernet layer. Host Layer 2 networking module 114 provides communication for cloud-native platform host 110 with internet 130. Host Layer 2 networking module 114 may disallow any communication from CNF's 112 (except for EAPoL) until authentication is completed. Host Layer 2 networking module 114 may be used to implement an authenticator 115, which may act as an 802.1x authenticator. Authenticator 115 may use an EAP-TLS protocol to relay EAP messages from CNF's 112 to authentication server 120. It should be appreciated that according to some embodiments (not illustrated in FIG. 1), Host Layer 2 networking module 114 may instead be configured to implement an 802.1x supplicant.

Authentication server 120 may receive and communicate with authenticator 115 using RADIUS protocol or diameter protocol, depending on the specific implementation. Authentication server 120 may be used to perform EAP-TLS authentication (for example, as per the RFC 5216 standard in IEEE) and may provide the results of the authentication back to authenticator 115. According to embodiments, authentication server 120 may also require using EAP-TLS certificates.

Figure 2:
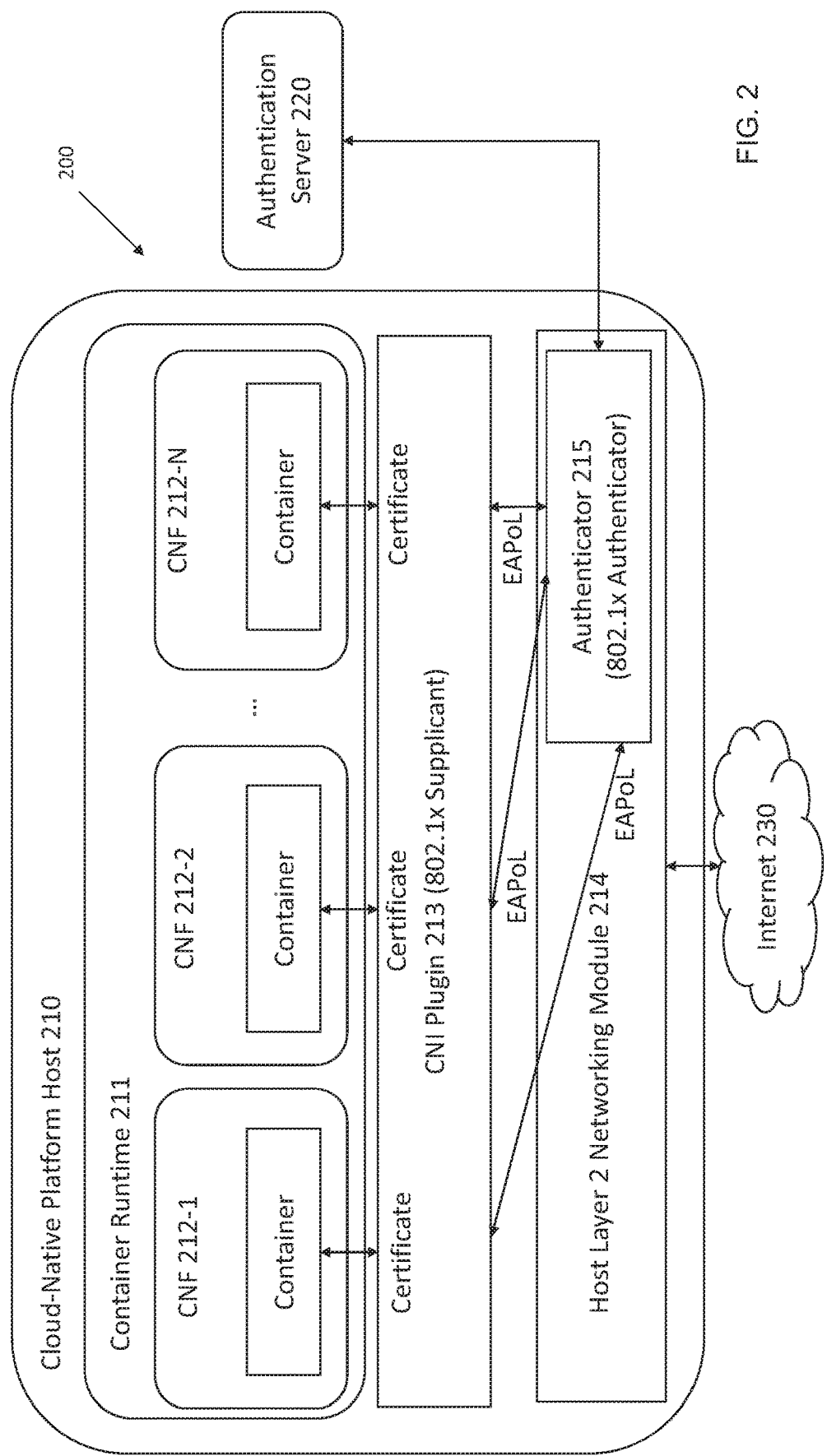
FIG. 2 illustrates a system architecture in which a Container Network Interface (CNI) plug-in acts as a supplicant for authentication according to an embodiment.

FIG. 2 illustrates a system architecture of a system 200 in which a Container Network Interface (CNI) plug-in acts as a supplicant for authentication according to an embodiment. It should be appreciated that the general architecture of system 200 may share similarities with system 100 described in FIG. 1 above, but primarily differs in that CNI Plug-in 213 receives certificates from CNF's 212, and CNI Plug-in 213 acts as an 802.1x supplicant. Nevertheless, each element is described below.

Cloud-native platform host 210 may include container runtime 211. Container runtime 211 may include a plurality of CNF's 212 (212-1, 212-2, . . . 212-N). CNF's 212 may be on-boarded (initialized) onto the cloud-native platform host 210 using container runtime 211, or a container orchestrator. Each CNF may have its own container, and communicate with CNI Plug-in 213 in order to perform the authentication. According to embodiments, CNF's 212 may provide a bootstrap transport layer security (TLS) certificate to CNI Plug-in 213.

Cloud-native platform host 210 may include a container network interface (CNI) plug-in 213, which acts as the 802.1x supplicant. It should be appreciated that according to some embodiments (not illustrated in FIG. 2), CNI plug-in 213 may instead be configured to act as an 802.1x authenticator. CNI plug-in 213 may be used to implement cluster networks and may be used for configuring communication between containers in container runtime 211 of cloud-native platform host 110. The CNI plug-in 213 may also be able to initialize CNF's 212 as a virtual interface. CNI Plug-in 213 may disallow any communication from CNF's 212 (except for EAPoL) until authentication is completed. CNI Plug-in 213 may request for the bootstrap TLS certificate from CNF's 212 (e.g., via a GET request) and verify whether the received bootstrap TLS certificate conforms to configured certificate profiles. If the bootstrap TLS certificate is not valid, the CNI Plug-in 213 may log the issue.

It should also be appreciated that the CNI plug-in 213 is merely an example of a supplicant, and the supplicant is not necessarily limited thereto. Other equivalents and/or variants of a CNI plug-in may be used to implement the supplicant as may be apparent to a person of ordinary skill in the art.

According to embodiments, a strict authentication mode may be implemented, which could enable or disable intra-CNF traffic (e.g., communication between different interfaces of the same CNF 212). When strict CNF authentication mode is enabled (on), intra-CNF traffic is allowed, and when strict CNF authentication mode is disabled (off), intra-CNF traffic is not allowed. CNI plug-in 213 or similar entities may be configured to implement strict CNF authentication mode.

Cloud-native platform host 210 may also include Host Layer 2 networking module 214. Host Layer 2 networking module 214 provides communication for cloud-native platform host 210 with internet 230. Host Layer 2 networking module 214 may be used to implement an authenticator 215, which may act as an 802.1x authenticator. Authenticator 215 may use an EAP-TLS protocol to relay EAP messages from CNF's 212 to authentication server 220. It should be appreciated that according to some embodiments (not illustrated in FIG. 2), authentication server 220 may instead be configured to implement an 802.1x supplicant.

Authentication server 220 may receive and communicate with authenticator 215 using RADIUS protocol or diameter protocol, depending on the specific implementation. Authentication server 230 may be used to perform EAP-TLS authentication (for example, as per the RFC 5216 standard in IEEE) and may provide the results of the authentication back to authenticator 215. According to embodiments, authentication server 220 may also require using EAP-TLS certificates.

Although the above example embodiments illustrated in FIG. 1 and FIG. 2 show an example architecture in which CNF's 112 or a CNI plug-in 213 act as an 802.1x supplicant, and a Host Layer 2 networking module 114, 214 implements an 802.1x authenticator (Authenticator 115, 215), according to some embodiments, CNF's 112 or CNI plug-in 213 may act as an 802.1x authenticator (e.g., the CNF or CNI plug-in may communicate with Authentication server 120, 220), and Host Layer 2 networking module 114 may implement an 802.1x supplicant. For example, a CNF may act as an authenticator in scenarios in which a CNF intends to establish connection with another CNF (e.g., inter-CNF communication), in scenarios involving inter-service communication, or communication between different tenants in the cloud-native platform.

Figure 3:
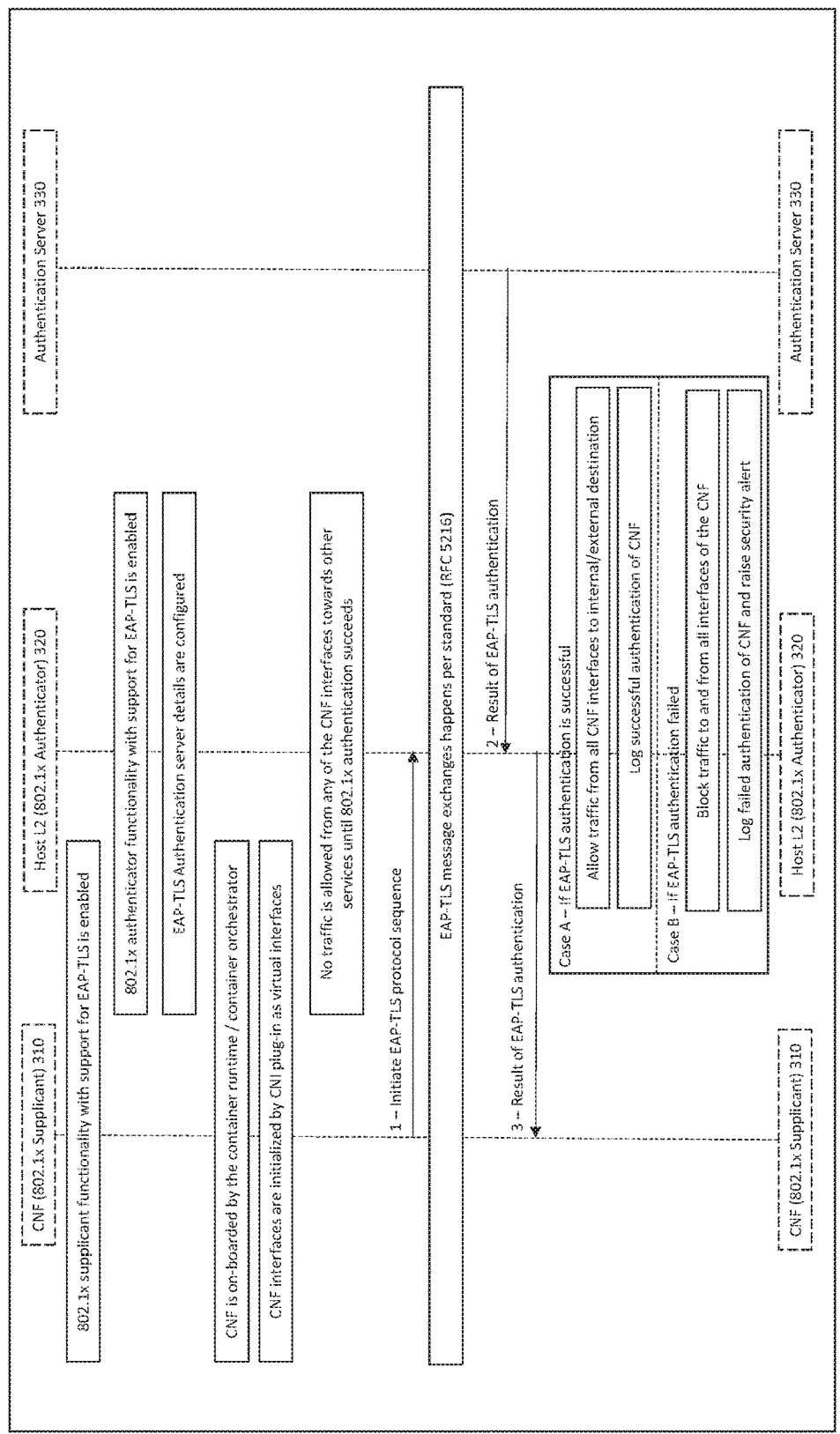
FIG. 3 illustrates a call-flow diagram of a method for CNF authentication in which a CNF acts as a supplicant according to an embodiment.

FIG. 3 illustrates a call-flow diagram of a method 300 for CNF authentication in which a CNF acts as a supplicant according to an embodiment. Method 300 may be implemented using a system architecture similar to that of system 100 described in FIG. 1 above. CNF 310 may act as an 802.1x supplicant, and may be similar to one of CNF's 112. Host Layer 2 (L2) 320 may act as an 802.1x authenticator, and may be similar to Host Layer 2 networking module 114 and/or authenticator 115. Authentication server 330 may be similar to authentication server 120.

Referring to FIG. 3, as a prerequisite, 802.1x supplicant functionality with support for EAP-TLS may firstly be enabled at CNF 310, and like-wise 802.1x authenticator functionality with support for EAP-TLS may firstly be enabled at Host L2 320. EAP-TLS authentication server details of authentication server 330 may also be configured at Host L2 320.

The CNF may be on-boarded by the container runtime (such as container runtime 111) or a container orchestrator, and the CNF interfaces are initialized by a CNI plug-in (e.g., CNI plug-in 113) as virtual interfaces. Host L2 320 may disallow any traffic from any of the CNF interfaces towards other services (e.g., excluding EAPoL and EAP-TLS messages) until the authentication process (using 802.1x authentication) succeeds.

Referring to FIG. 3, at operation 1, the CNF 310 may initiate an EAP-TLS protocol sequence with Host L2 320. This may include sending a message to Host L2 320. Upon receiving this message, EAP-TLS message exchange may occur between CNF 310 (the 802.1x supplicant), Host L2 320 (the 802.1x authenticator) and authentication server 330 per the relevant standard (for example, RFC 5216).

Upon completing the authentication procedure using the EAP-TLS message exchange, at operation 2, the result of the EAP-TLS authentication (which may either indicate that the EAP-TLS was successful or failed) is returned to Host L2

320 by authentication server 330. At operation 3, the result of the EAP-TLS authentication may also be forwarded by Host L2 320 to CNF 310.

If EAP-TLS authentication was successful (Case A with reference to FIG. 3), the Host L2 320 may allow traffic from all CNF interfaces to the internal/external destination, and accordingly log a successful authentication of the CNF.

If EAP-TLS authentication failed (Case B with reference to FIG. 3), the Host L2 320 may block traffic to and from all interfaces of the CNF, and log a failed authentication of the CNF.

Figure 4A:
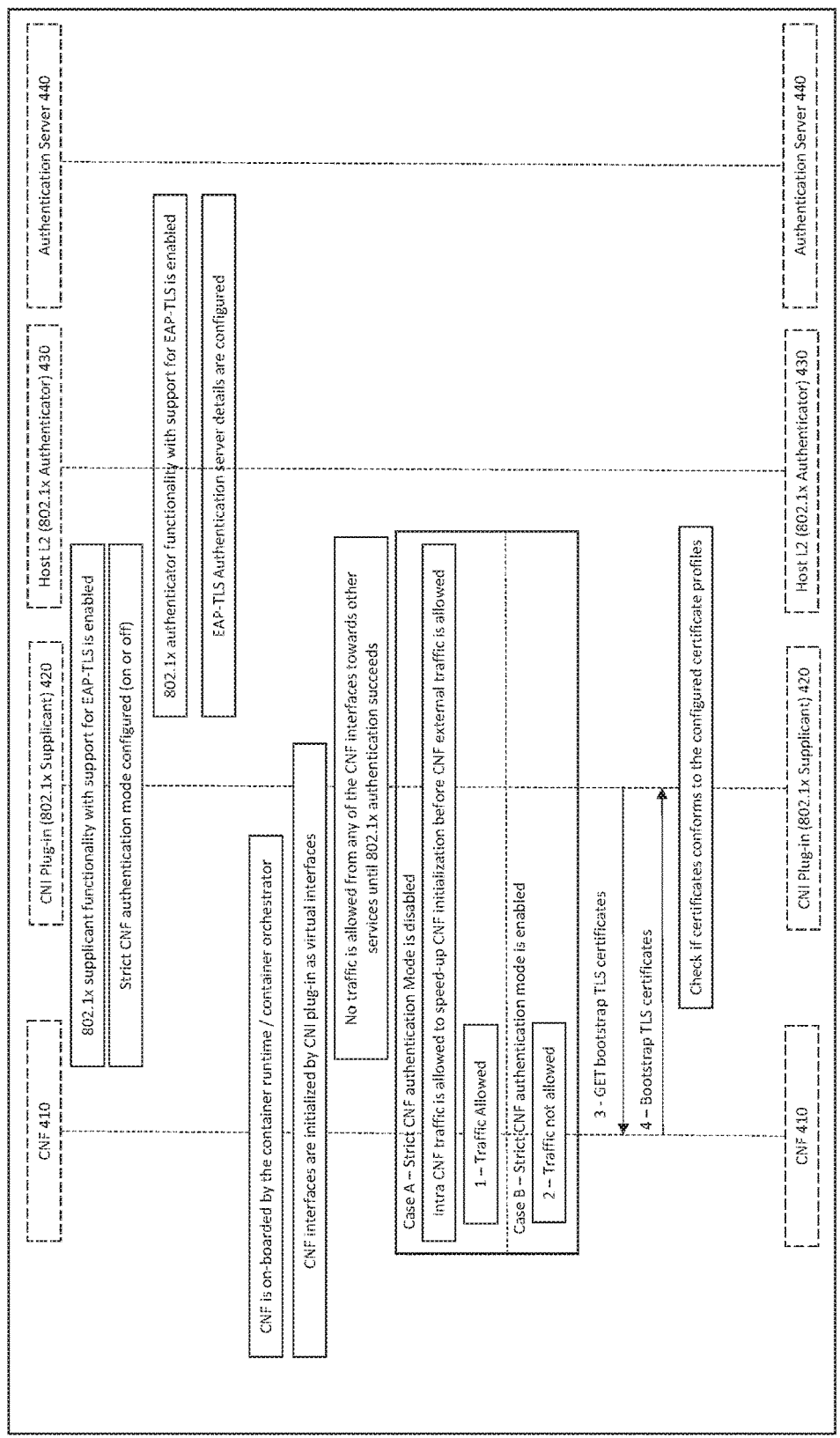
FIGS. 4A-4B illustrates a call-flow diagram of a method for CNF authentication in which a CNI plug-in acts as a supplicant according to an embodiment.
Figure 4B:
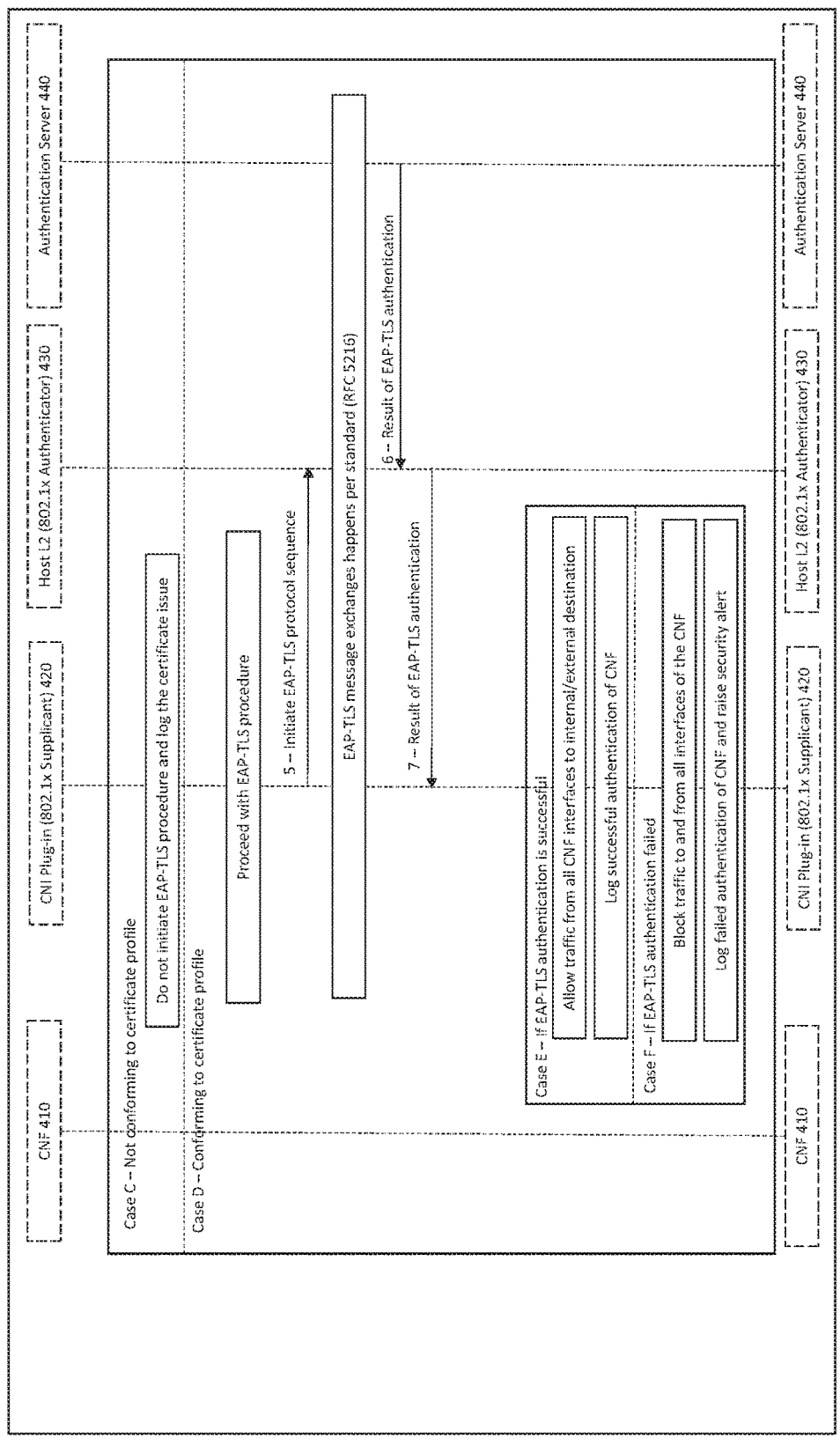

FIGS. 4A-4B illustrates a call-flow diagram of a method 400 for CNF authentication wherein a CNI plug-in acts as a supplicant according to an embodiment. Method 400 may be implemented using a system architecture similar to that of system 200 described in FIG. 2 above. CNF 410 may be similar to one of CNF's 212. CNI Plug-in 420 may act as the 802.1x supplicant, and may be similar to CNI Plug-in 213. Host Layer 2 (L2) 430 may act as an 802.1x authenticator, and may be similar to Host Layer 2 networking module 214 and/or authenticator 215. Authentication server 440 may be similar to authentication server 220.

Referring to FIG. 4A, as a prerequisite, 802.1x supplicant functionality with support for EAP-TLS may firstly be enabled at CNI Plug-in 420, and like-wise 802.1x authenticator functionality with support for EAP-TLS may firstly be enabled at Host L2 430. Strict CNF authentication mode may also be configured at CNI Plug-in 420 (either on/enabled or off/disabled). EAP-TLS authentication server details of authentication server 330 may also be configured at Host L2 430.

The CNF may be on-boarded by the container runtime (such as container runtime 211) or a container orchestrator, and the CNF interfaces are initialized by a CNI plug-in 420 as virtual interfaces. CNI Plug-in 420 may disallow any traffic from any of the CNF interfaces towards other services (e.g., excluding EAPoL and EAP-TLS messages) until the authentication process (using 802.1x authentication) succeeds.

Referring to FIG. 4A, if strict CNF authentication mode is disabled (case A with reference to FIG. 4A), intra-CNF traffic is allowed at operation 1. This is in order to allow CNF initialization to be sped up before external traffic for the CNF 410 is allowed. However, if strict CNF authentication mode is enabled (Case B with reference to FIG. 4A), intra-CNF traffic is not allowed at operation 2.

At operation 3, the CNI Plug-in 420 may request for bootstrap TLS certificates from CNF 410 (using a GET request). At operation 4, the CNI Plug-in 420 may provide the requested bootstrap TLS certificate. CNI Plug-in 420 may accordingly check to see if the bootstrap TLS certificate conforms to a configured certificate profile.

Referring now to FIG. 4B, the CNI Plug-in 420 may determine based on checking the bootstrap TLS certificate conforms to the certificate profile or not. If it does not conform to the configured certificate profile (Case C with reference to FIG. 4B), the CNI Plug-in 420 will not initiate the EAP-TLS procedure and log the certificate issue. No subsequent actions will be performed thereafter, and the authentication procedure may not occur.

On the other hand, if the bootstrap TLS certificate conforms to the configured certificate profile (Case D with reference to FIG. 4B), the CNI Plug-in 420 may proceed with the EAP-TLS procedure.

Referring to FIG. 4B, at operation 5, the CNI Plug-in 420 may initiate an EAP-TLS protocol sequence with Host L2 430. This may include sending a message to Host L2 430.

Upon receiving this message, EAP-TLS message exchange may occur between CNI Plug-in 420 (the 802.1x supplicant), Host L2 430 (the 802.1x authenticator) and authentication server 440 per the relevant standard (for example, RFC 5216). It should be noted that CNF 410 does not send or receive any EAP-TLS messages during this process.

Upon completing the authentication procedure using the EAP-TLS message exchange, at operation 6, the result of the EAP-TLS authentication (which may either indicate that the EAP-TLS was successful or failed) is returned to Host L2 430 from authentication server 440. At operation 7, the result of the EAP-TLS authentication may also be forwarded by Host L2 430 to CNI Plug-in 420.

If EAP-TLS authentication was successful (Case E with reference to FIG. 4B), the CNI Plug-in 420 may allow traffic from all CNF interfaces to the internal/external destination, and accordingly log a successful authentication of the CNF.

If EAP-TLS authentication failed (Case F with reference to FIG. 4B), the CNI Plug-in 420 may block traffic to and from all interfaces of the CNF, and log a failed authentication of the CNF. A security alert may also be raised by CNI Plug-in 420.

FIG. 5 illustrates a flowchart of a method 500 for CNF authentication according to an embodiment. Method 500 generalizes the message exchange that occurs between a supplicant and authenticator, and may encompass operations 1-3 from method 300 with reference to FIG. 3, and/or operations 5-7 from method 400 with reference to FIG. 4B.

At operation 501, a supplicant (e.g., either a CNF 112, 212 or a CNI Plug-in 213 as described above) may send a message to initiate EAP-TLS protocol to an authenticator (e.g., a Host L2 networking module similar to Host Layer 2 Networking Module 114, 214 described above). This may occur during an instantiation and bootstrapping stage of the CNF. Upon the authenticator receiving the message, EAP-TLS authentication may be performed using an authentication server (e.g., authentication server 120, 220 as described above).

At operation 502, the supplicant may receive the result of the EAP-TLS authentication from the authenticator, which may originate from the authentication server. The authenticator is configured to control traffic of the CNF based on the result of the EAP-TLS authentication. That is, if the result is that EAP-TLS authentication was successful, the authenticator is configured to allow traffic from all interfaces of the CNF, and if it failed, the authenticator is configured to block traffic from all interfaces of the CNF. According to some embodiments, the authenticator may log the result of the authentication.

Figure 6:
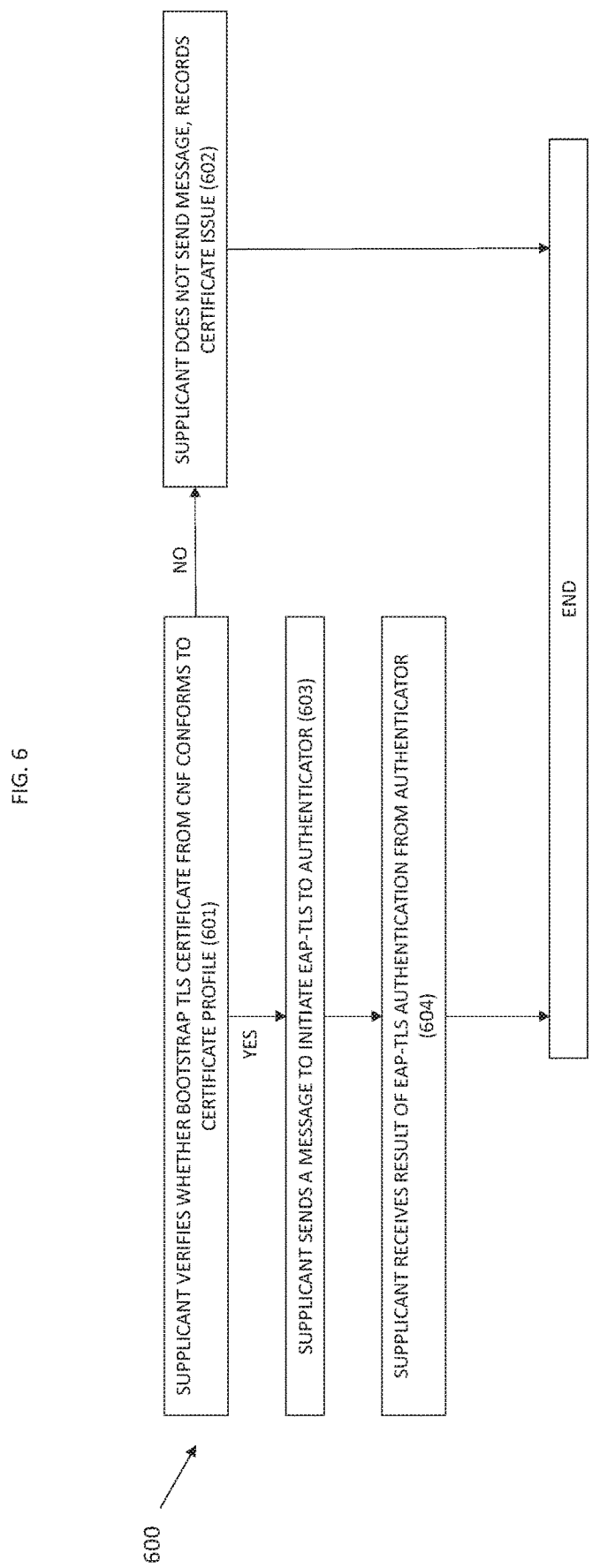
FIG. 6 illustrates a flowchart of a method for CNF authentication including bootstrap certificate verification according to an embodiment.

FIG. 6 illustrates a flowchart of a method 600 for CNF authentication including bootstrap certificate verification according to an embodiment. It should be noted that method 600 is an example embodiment in which the supplicant is a CNI Plug-in. Method 600 may encompass operations 1-7 from method 400 with reference to FIGS. 4A and 4B.

At operation 601, prior to sending any message, the supplicant (e.g., CNI Plug-in 213) verifies whether a bootstrap TLS certificate received from the CNF (e.g., CNF 212) conforms to a configured certificate profile. If it does not, operation 602 may occur, wherein the supplicant will not send any message, and a certificate issue may be logged, and the process may end thereafter.

On the other hand, if it was verified that the CNF conforms to the configured certificate profile by the supplicant, at operation 603, the supplicant may send a message to initiate EAP-TLS protocol to an authenticator (e.g., a Host L2 networking module similar to Host Layer 2 Networking Module 214 described above). This may occur during an instantiation and bootstrapping stage of the CNF. Upon the authenticator receiving the message, EAP-TLS authentication may be performed using an authentication server (e.g., authentication server 220 as described above).

At operation 604, the supplicant may receive the result of the EAP-TLS authentication from the authenticator, which may originate from the authentication server. The authenticator is configured to control traffic of the CNF based on the result of the EAP-TLS authentication. That is, if the result is that EAP-TLS authentication was successful, the authenticator is configured to allow traffic from all interfaces of the CNF, and if it failed, the authenticator is configured to block traffic from all interfaces of the CNF.

Accordingly, authentication can be achieved at the Ethernet layer (L2) during the onboarding and instantiation stage for the CNF, and provide network isolation on any unsuccessful authentication attempt, since all communications (except Extensive Authentication Protocol over LAN (EAPoL)) for the CNF will be blocked by the cloud-native platform.

Figure 7:
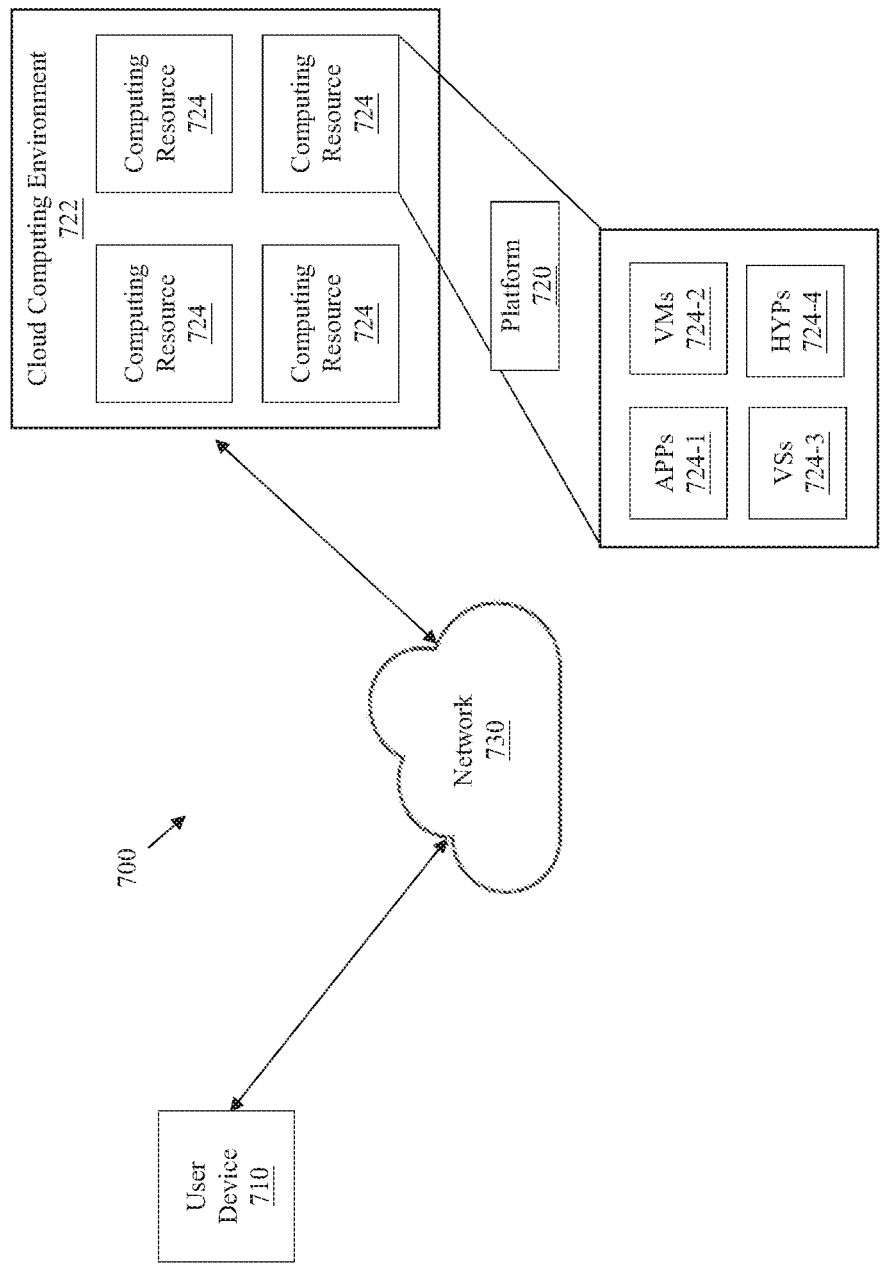
FIG. 7 is a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIG. 1 above may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc., services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like. It is understood that one or more example embodiments are not limited to a particular type of cloud computing environment, and may be implemented on one or more servers in the form of virtualized network functions (VNFs), containerized and/or cloud-native functions (CNFs), and the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

According to embodiments, the authentication process (or one or more operations associated therewith) described herein may be implemented or be deployed in the server platform described above, in the form of virtualized network function (VNF). In this regard, it is contemplated that the terms "virtual", "virtualized", or the like, described hereinabove are merely intended to specify the nature of the machine (and the elements and resources associated therewith) being provided in virtual or software form. In this regard, the "virtual machine", "virtualized storage", and the like, described hereinabove should not be limited to any specific type of virtual machine or virtual element. Accordingly, it can be understood that the (or operations associated therewith) may be defined or presented in the form of a containerized network function, of which the functions may be provided in the form of containers.

Figure 8:
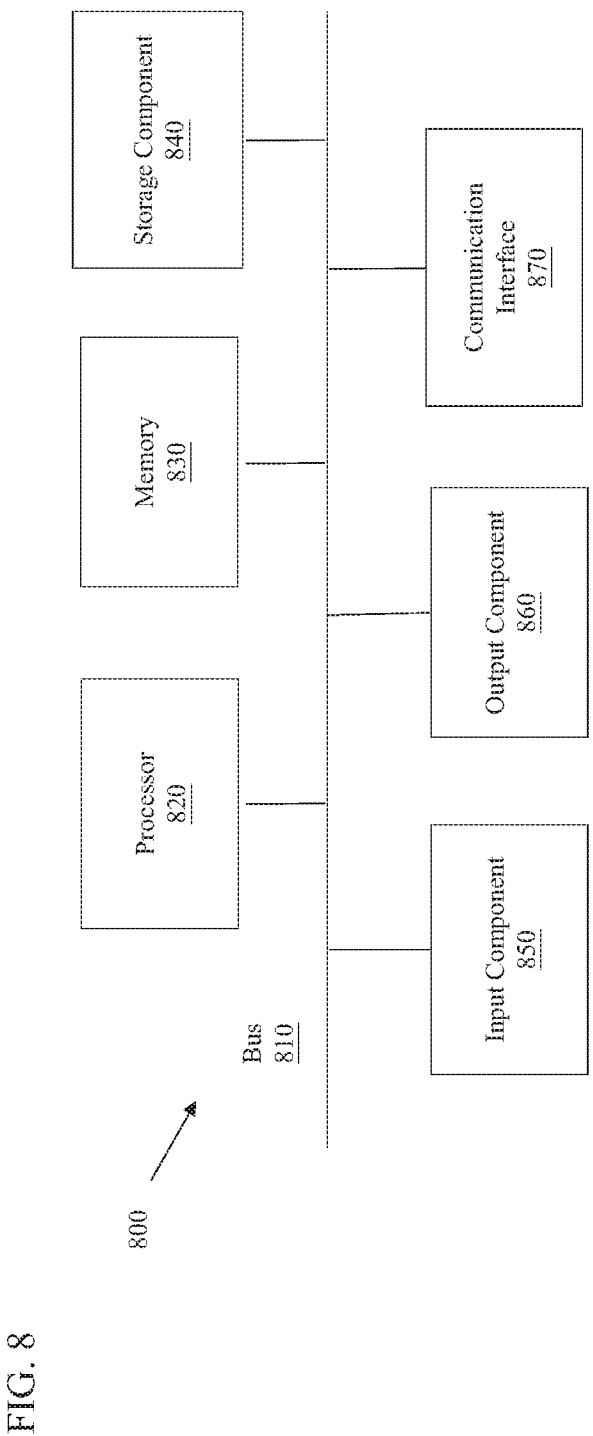
FIG. 8 is a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 1-6 may be implemented by or using any one of the elements illustrated in FIGS. 7 and 8. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

In view of the above, various further respective aspects and features of embodiments of the present disclosure may be defined by the following items:

Item [1]: A method including: sending, by a supplicant to an authenticator during an instantiation and bootstrapping stage of a cloud-native function (CNF), a message to initiate an Extensible Authentication Protocol-Transport Layer Security (EAP-TLS) protocol sequence, wherein an EAP-TLS authentication is performed with an authentication server based on the message; receiving, by the supplicant, a result of the EAP-TLS authentication from the authenticator, wherein the result of the EAP-TLS authentication originates from the authentication server, and wherein the authenticator is configured to control traffic of the CNF based on the result of the EAP-TLS authentication.

Item [2]: The method according to item [1], wherein the authenticator is a host layer 2 (L2) networking module, and the supplicant is the CNF.

Item [3]: The method according to item [2], wherein the authenticator is the CNF, and the supplicant is a host layer 2 (L2) networking module.

Item [4]: The method according to any one of items [1]-[2], wherein if the result of the EAP-TLS authentication is successful, the authenticator is configured to allow traffic from the CNF, and wherein if the result of the EAP-TLS authentication is not successful, the authenticator is configured to block traffic from the CNF.

Item [5]: The method according to any one of items [1] or [4], further including: prior to sending the message, verifying, by the supplicant, whether a bootstrap Transport Layer Security (TLS) certificate from the CNF conforms to a certificate profile, wherein if the bootstrap TLS certificate from the CNF does not conform to the certificate profile, the message is not sent and a certificate issue is recorded by the supplicant.

Item [6]: The method according to any one of items [1], [4], or [5], wherein the authenticator is a host layer 2 (L2) networking module, and the supplicant is a Container Network Interface (CNI) plug-in.

Item [7]: The method according to item [6], wherein based on a strict CNF authentication mode being configured at the CNI plug-in, intra-CNF traffic is not allowed for the CNF until the EAP-TLS authentication succeeds.

Item [8]: A supplicant configured to: send to an authenticator during an instantiation and bootstrapping stage of a cloud-native function (CNF), a message to initiate an Extensible Authentication Protocol-Transport Layer Security (EAP-TLS) protocol sequence, wherein an EAP-TLS authentication is performed with an authentication server based on the message; receive a result of the EAP-TLS authentication from the authenticator, wherein the result of the EAP-TLS authentication originates from the authentication server, and wherein the authenticator is configured to control traffic of the CNF based on the result of the EAP-TLS authentication.

Item [9]: The supplicant according to item [8], wherein the authenticator is a host layer 2 (L2) networking module, and the supplicant is the CNF.

Item [10]: The supplicant according to item [8], wherein the authenticator is the CNF, and the supplicant is a host layer 2 (L2) networking module.

Item [11]: The supplicant according to any one of items [8]-[9], wherein if the result of the EAP-TLS authentication is successful, the authenticator is configured to allow traffic from the CNF, and if the result of the EAP-TLS authentication is not successful, the authenticator is configured to block traffic from the CNF.

Item [12]: The supplicant according to any one of items [8] or [11], wherein the supplicant is further configured to: prior to sending the message, verify whether a bootstrap Transport Layer Security (TLS) certificate from the CNF conforms to a certificate profile, wherein if the bootstrap TLS certificate from the CNF does not conform to the certificate profile, the message is not sent, and the supplicant is further configured to record a certificate issue.

Item [13]: The supplicant according to any one of items [8], [11], or [12], wherein the authenticator is a host layer 2 (L2) networking module, and the supplicant is a Container Network Interface (CNI) plug-in.

Item [14]: The supplicant according to item wherein based on a strict CNF authentication mode being configured at the CNI plug-in, intra-CNF traffic is not allowed for the CNF until the EAP-TLS authentication succeeds.

Item [15]: A non-transitory computer-readable recording medium having recorded thereon instructions to perform a method including: sending, by a supplicant to an authenticator during an instantiation and bootstrapping stage of a cloud-native function (CNF), a message to initiate an Extensible Authentication Protocol-Transport Layer Security (EAP-TLS) protocol sequence, wherein an EAP-TLS authentication is performed with an authentication server based on the message; receiving, by the supplicant, a result of the EAP-TLS authentication from the authenticator, wherein the result of the EAP-TLS authentication originates from the authentication server, and wherein the authenticator is configured to control traffic of the CNF based on the result of the EAP-TLS authentication.

Item [16]: The non-transitory computer-readable recording medium according to item [15], wherein the authenticator is a host layer 2 (L2) networking module, and the supplicant is the CNF.

Item [17]: The non-transitory computer-readable recording medium according to item [15], wherein the authenticator is the CNF, and the supplicant is the host layer 2 (L2) networking module.

Item [18]: The non-transitory computer-readable recording medium according to any one of items [15]-[16], wherein if the result of the EAP-TLS authentication is successful, the authenticator is configured to allow traffic from the CNF, and wherein if the result of the EAP-TLS authentication is not successful, the authenticator is configured to block traffic from the CNF.

Item [19]: The non-transitory computer-readable recording medium according to any one of items or [18], further including: prior to sending the message, verifying, by the supplicant, whether a bootstrap Transport Layer Security (TLS) certificate from the CNF conforms to a certificate profile, wherein if the bootstrap TLS certificate from the CNF does not conform to the certificate profile, the message is not sent, and the method further comprises: recording, by the supplicant, a certificate issue, wherein the supplicant is a Container Network Interface (CNI) plug-in.

Item [20]: The non-transitory computer-readable recording medium according to item [19], wherein the authenticator is a host layer 2 (L2) networking module, wherein the supplicant is a Container Network Interface (CNI) plug-in, wherein based on a strict CNF authentication mode being configured at the CNI plug-in, intra-CNF traffic is not allowed for the CNF until the EAP-TLS authentication succeeds.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method comprising:
sending, by a supplicant to an authenticator during an instantiation and bootstrapping stage of a cloud-native function (CNF), a message to initiate an Extensible Authentication Protocol-Transport Layer Security (EAP-TLS) protocol sequence, wherein an EAP-TLS authentication is performed with an authentication server based on the message; and
receiving, by the supplicant, a result of the EAP-TLS authentication from the authenticator, wherein the result of the EAP-TLS authentication originates from the authentication server, and wherein the authenticator is configured to control traffic of the CNF based on the result of the EAP-TLS authentication.

2. The method of claim 1, wherein the authenticator is a host layer 2 (L2) networking module, and the supplicant is the CNF.

3. The method of claim 1, wherein the authenticator is the CNF, and the supplicant is a host layer 2 (L2) networking module.

4. The method of claim 1, wherein if the result of the EAP-TLS authentication is successful, the authenticator is configured to allow traffic from the CNF, and wherein if the result of the EAP-TLS authentication is not successful, the authenticator is configured to block traffic from the CNF.

5. The method of claim 1, further comprising:
prior to sending the message, verifying, by the supplicant, whether a bootstrap Transport Layer Security (TLS) certificate from the CNF conforms to a certificate profile,
wherein if the bootstrap TLS certificate from the CNF does not conform to the certificate profile, the message is not sent and a certificate issue is recorded by the supplicant.

6. The method of claim 5, wherein the authenticator is a host layer 2 (L2) networking module, and the supplicant is a Container Network Interface (CNI) plug-in.

7. The method of claim 6, wherein based on a strict CNF authentication mode being configured at the CNI plug-in, intra-CNF traffic is not allowed for the CNF until the EAP-TLS authentication succeeds.

8. A supplicant configured to:
send to an authenticator during an instantiation and bootstrapping stage of a cloud-native function (CNF), a message to initiate an Extensible Authentication Protocol-Transport Layer Security (EAP-TLS) protocol sequence, wherein an EAP-TLS authentication is performed with an authentication server based on the message; and
receive a result of the EAP-TLS authentication from the authenticator, wherein the result of the EAP-TLS authentication originates from the authentication server, and wherein the authenticator is configured to control traffic of the CNF based on the result of the EAP-TLS authentication.

9. The supplicant of claim 8, wherein the authenticator is a host layer 2 (L2) networking module, and the supplicant is the CNF.

10. The supplicant of claim 8, wherein the authenticator is the CNF, and the supplicant is a host layer 2 (L2) networking module.

11. The supplicant of claim 8, wherein if the result of the EAP-TLS authentication is successful, the authenticator is configured to allow traffic from the CNF, and wherein if the result of the EAP-TLS authentication is not successful, the authenticator is configured to block traffic from the CNF.

12. The supplicant of claim 8, wherein the supplicant is further configured to:
prior to sending the message, verify whether a bootstrap Transport Layer Security (TLS) certificate from the CNF conforms to a certificate profile, wherein if the bootstrap TLS certificate from the CNF does not conform to the certificate profile, the message is not sent, and the supplicant is further configured to record a certificate issue, wherein the supplicant is a Container Network Interface (CNI) plug-in.

13. The supplicant of claim 12, wherein the authenticator is a host layer 2 (L2) networking module, and the supplicant is a Container Network Interface (CNI) plug-in.

14. The supplicant of claim 13, wherein based on a strict CNF authentication mode being configured at the CNI plug-in, intra-CNF traffic is not allowed for the CNF until the EAP-TLS authentication succeeds.

15. A non-transitory computer-readable recording medium having recorded thereon instructions to perform a method comprising:
sending, by a supplicant to an authenticator during an instantiation and bootstrapping stage of a cloud-native function (CNF), a message to initiate an Extensible Authentication Protocol-Transport Layer Security (EAP-TLS) protocol sequence, wherein an EAP-TLS authentication is performed with an authentication server based on the message; and
receiving, by the supplicant, a result of the EAP-TLS authentication from the authenticator, wherein the result of the EAP-TLS authentication originates from the authentication server, and wherein the authenticator is configured to control traffic of the CNF based on the result of the EAP-TLS authentication.

16. The non-transitory computer-readable recording medium of claim 15, wherein the authenticator is a host layer 2 (L2) networking module, and the supplicant is the CNF.

17. The non-transitory computer-readable recording medium of claim 15, wherein the authenticator is the CNF, and the supplicant is a host layer 2 (L2) networking module.

18. The non-transitory computer-readable recording medium of claim 15, wherein if the result of the EAP-TLS authentication is successful, the authenticator is configured to allow traffic from the CNF, and if the result of the EAP-TLS authentication is not successful, the authenticator is configured to block traffic from the CNF.

19. The non-transitory computer-readable recording medium of claim 15, wherein the method further comprises:
prior to sending the message, verifying, by the supplicant, whether a bootstrap Transport Layer Security (TLS) certificate from the CNF conforms to a certificate profile; and
if the bootstrap TLS certificate from the CNF does not conform to the certificate profile, the message is not sent, and a certificate issue is recorded by the supplicant.

20. The non-transitory computer-readable recording medium of claim 19, wherein the authenticator is a host layer 2 (L2) networking module, wherein the supplicant is a Container Network Interface (CNI) plug-in wherein based on a strict CNF authentication mode being configured at the CNI plug-in, intra-CNF traffic is not allowed for the CNF until the EAP-TLS authentication succeeds.

* * * * *